(12) United States Patent
Zhao (10) Patent No.: US 11,775,625 B2
(45) Date of Patent: Oct. 3, 2023

(54) ALERT TASK PROCESSING METHOD, TERMINAL, AND COMPUTER-READABLE STORAGE MEDIUM

(71) Applicant: VIVO MOBILE COMMUNICATION CO., LTD., Guangdong (CN)

(72) Inventor: Peng Zhao, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 168 days.

(21) Appl. No.: 17/411,133

(22) Filed: Aug. 25, 2021

(65) Prior Publication Data

US 2021/0385323 A1 Dec. 9, 2021

Related U.S. Application Data

(63) Continuation of application No. PCT/CN2020/073956, filed on Jan. 23, 2020.

(30) Foreign Application Priority Data

Feb. 26, 2019 (CN) .......................... 201910142050.6

(51) Int. Cl.
*G06F 21/32* (2013.01)
*G06V 40/50* (2022.01)
(Continued)

(52) U.S. Cl.
CPC ............ *G06F 21/32* (2013.01); *G06V 40/161* (2022.01); *G06V 40/168* (2022.01);
(Continued)

(58) Field of Classification Search
CPC .... G06F 21/32; G06F 3/04817; G06F 3/0482; G06F 21/31; G06F 3/0481; G06F 3/0488; G06F 21/84; G06F 18/22; G06F 21/6245; G06F 21/88; G06F 21/608; G06V 40/161; G06V 40/168; G06V 40/172; G06V 40/174; G06V 40/50; G06V 40/70; G06V 40/40; G06V 40/18; G06V 40/10; G06V 20/52;
(Continued)

(56) References Cited

U.S. PATENT DOCUMENTS

2003/0215114 A1* 11/2003 Kyle ...................... G06V 10/94
382/115
2008/0123907 A1* 5/2008 Eura .................... G06V 40/172
382/118
(Continued)

FOREIGN PATENT DOCUMENTS

CN 104808921 A 7/2015
CN 104932879 A 9/2015
(Continued)

*Primary Examiner* — Nimesh Patel
(74) *Attorney, Agent, or Firm* — Price Heneveld LLP (57) ABSTRACT

The present disclosure provides an alert task processing method, a terminal, and a computer-readable storage medium. The alert task processing method includes: receiving a first input of a first operator; performing a screen capturing operation, outputting a screenshot, and obtaining first biometric feature information of the first operator in response to the first input; and performing a target alert task based on the screenshot and the first biometric feature information.

20 Claims, 3 Drawing Sheets

(51) Int. Cl.
*G06V 40/16* (2022.01)
*G06V 40/70* (2022.01)
*H04M 1/72463* (2021.01)

(52) U.S. Cl.
CPC .......... *G06V 40/172* (2022.01); *G06V 40/174* (2022.01); *G06V 40/50* (2022.01); *G06V 40/70* (2022.01); *H04M 1/724631* (2022.02)

(58) Field of Classification Search
CPC ........ G06V 30/10; G06V 40/16; G06V 10/20; G06V 30/1444; G06V 40/11; G06V 40/12; G06V 40/13; G06V 40/173; G06V 40/1365; G06V 40/166; G06V 10/10; G06V 40/1359; G06V 40/1335; G06V 20/44; G06V 40/45; H04M 1/724631; H04M 1/72451; H04M 1/667; H04M 1/72448; H04M 1/72463; H04M 1/72457; H04M 1/72403; H04M 2250/60; H04M 1/66; H04M 2250/52; H04M 2203/558; G06Q 20/40145; G06Q 50/01; G06Q 20/308; G06Q 20/32; G06Q 20/321; G06Q 20/4014; G06Q 50/184; G06Q 50/265; G06Q 20/401; H04W 4/029; H04W 4/02; H04W 4/021; H04W 12/06; H04W 12/08; H04W 12/126; H04W 12/12; H04W 12/76; H04W 12/065; H04W 12/104; H04W 12/30; H04W 12/37; H04W 12/40; H04W 12/69; H04W 12/72; H04W 12/02; G07C 9/37; G07C 2009/00769; G07C 9/00309; G07C 9/20; G07C 2209/02; G07C 9/38; G07C 9/22; G07C 9/27; G07C 9/25; G07C 9/00563; G07C 9/00904; G07C 9/28; G07C 9/26; H04L 63/0861; H04L 67/52; H04L 63/10; H04L 2209/80; H04L 63/04; H04L 63/0442; H04L 63/08; H04L 63/083; H04L 63/0876; H04L 63/0884; H04L 63/107; G06T 7/00; G06T 2207/30201; G06T 2207/30004; G06T 2207/20084; G06T 1/00; G06T 7/0002; G06T 7/73
See application file for complete search history.

(56) References Cited

U.S. PATENT DOCUMENTS

| | | | |
|---|---|---|---|
| 2015/0058369 A1* | 2/2015 | Kong | G06F 16/958 707/756 |
| 2016/0307434 A1 | 10/2016 | Wang et al. | |
| 2017/0053435 A1* | 2/2017 | Reymann | G07C 9/00563 |
| 2017/0123743 A1 | 5/2017 | Zhao | |

FOREIGN PATENT DOCUMENTS

| | | |
|---|---|---|
| CN | 105611029 A | 5/2016 |
| CN | 105912184 A | 8/2016 |
| CN | 107577956 A | 1/2018 |
| CN | 108881596 A | 11/2018 |
| CN | 109981890 A | 7/2019 |

* cited by examiner

ALERT TASK PROCESSING METHOD, TERMINAL, AND COMPUTER-READABLE STORAGE MEDIUM

CROSS-REFERENCE OF RELATED APPLICATION

This application is a continuation application of International Application No. PCT/CN2020/073956 filed on Jan. 23, 2020, which claims priority to Chinese Patent Application No. 201910142050.6 filed in China on Feb. 26, 2019, both disclosures of which are incorporated herein by reference in their entireties.

TECHNICAL FIELD

The embodiments of the present disclosure relate to the field of communication technologies, and in particular, to an alert task processing method, a terminal, and a computer-readable storage medium.

BACKGROUND

At present, in a process of daily usage of a mobile phone, when a user sees an interface of a screen, the user sometimes remembers that there is something that is not done or there is something that needs to be done at a time in the future. In general, in this case, the user creates a new event for alert in a sticky note, a calendar, or a third-party list software. Alternatively, the user talks to a voice assistant (such as Siri) in a mobile phone, and then a system automatically generates an event and reminds the user to do something at a preset time.

However, the biggest disadvantage of creating a new event in a sticky note or a calendar is being troublesome. The user needs to open corresponding software and enter a text to record what the user thought at that moment. If the user forgets to set an alert time, it is highly possible that this record cannot serve the expected purpose. In addition to being troublesome, the third-party list software cannot remind the user at a preset time after the application is killed, and cannot serve the purpose of alert either.

Although using a voice assistant to help remind a user to do something is quick, when it is inconvenient to talk, for example, in a meeting room or a movie theater, it is not convenient to use the voice assistant. In addition, when an event is private, it is not convenient to use the voice assistant directly either.

SUMMARY

According to a first aspect, an embodiment of the present disclosure provides an alert task processing method, including:
receiving a first input of a first operator;
performing a screen capturing operation, outputting a screenshot, and obtaining first biometric feature information of the first operator in response to the first input; and
performing a target alert task based on the screenshot and the first biometric feature information.

According to a second aspect, an embodiment of the present disclosure further provides a terminal, including:
a first receiving module, configured to receive a first input of a first operator;
a first processing module, configured to perform a screen capturing operation, output a screenshot, and obtain first biometric feature information of the first operator in response to the first input; and
a first execution module, configured to perform a target alert task based on the screenshot and the first biometric feature information.

According to a third aspect, an embodiment of the present disclosure further provides a terminal, including a processor, a memory, and a computer program stored in the memory and executable on the processor. When the computer program is executed by the processor, steps of the foregoing alert task processing method are implemented.

According to a fourth aspect, an embodiment of the present disclosure further provides a computer-readable storage medium. The computer-readable storage medium stores a computer program, and when the computer program is executed by a processor, steps of the foregoing alert task processing method are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
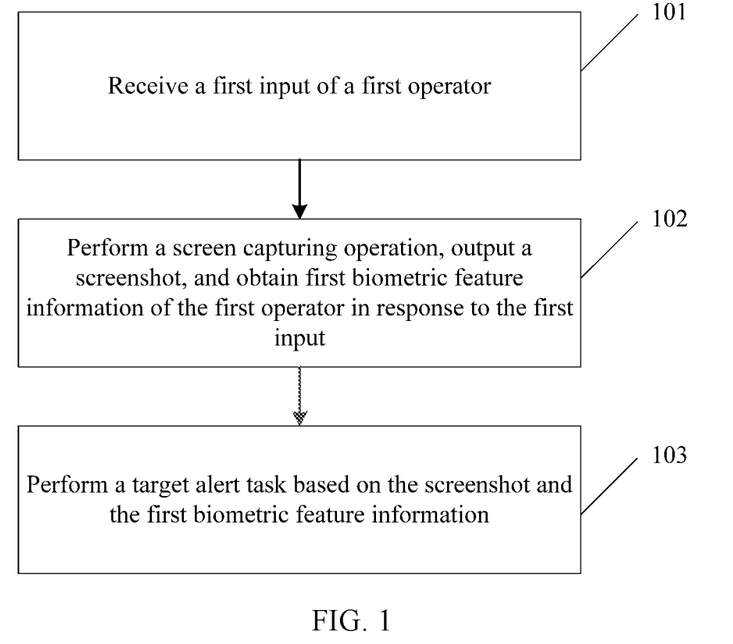
FIG. 1 is a schematic flowchart of an alert task processing method according to an embodiment of the present disclosure.

In view of the problem of poor privacy of an alert task processing solution in related technologies, the present disclosure provides an alert task processing method. As shown in FIG. 1, the method includes:

Step 101: Receive a first input of a first operator.

The first input can be any input that can trigger a screen capturing operation, for example, a preset tapping operation (such as double-click and click), a preset sliding operation (such as sliding to the left of the screen and sliding to the right of the screen), a preset pressing operation (such as an operation of pressing for a preset length of time), and pressing a preset button, or any combination of the foregoing multiple operations.

Step 102: Perform a screen capturing operation, output a screenshot, and obtain first biometric feature information of the first operator in response to the first input.

The first biometric feature information is not limited to face information. Specifically, the biometric feature information may include at least one of the following: face information, fingerprint information, or iris information.

The face information may be collected by a front-facing camera of a terminal, the fingerprint information may be collected by a fingerprint sensor of the terminal, and the iris information may be collected by the front-facing camera of the terminal. However, this constitutes no limitation.

Step 103: Perform a target alert task based on the screenshot and the first biometric feature information.

Specifically, the target alert task may be performed according to alert information obtained from the screenshot and the first biometric feature information. When the biometric feature information of the operator currently using the terminal does not match the first biometric feature information, execution of the target alert task is delayed.

This not only facilitates editing of an alert event, but also ensures privacy of a recorded event of the operator, thereby improving security of task alert.

Therefore, in the alert task processing method provided in the embodiments of the present disclosure, a first input of a first operator is received; a screen capturing operation is performed, a screenshot is output, and first biometric feature information of the first operator is obtained in response to the first input; and a target alert task is performed based on the screenshot and the first biometric feature information. This can avoid privacy leakage caused by event alert when a mobile phone is not used by an owner, and privacy of the owner can be well protected. Because the target alert task is performed based on the first biometric feature information, security of task alert is improved.

Further, during generation of the alert task, after the performing a screen capturing operation, outputting a screenshot, and obtaining biometric feature information of the operator in response to the first input; and before the performing a target alert task based on the screenshot and the biometric feature information, the method further includes: determining an alert time; determining alert information based on the screenshot; and generating the target alert task based on the alert information and the alert time.

That is, generation of the target alert task is mainly related to the alert time and the alert information. The alert time may be obtained based on the screenshot, or obtained based on input information, or determined based on a default alert delay time. The screenshot may be directly used as the alert information, or information may be extracted from the screenshot as the alert information. However, this constitutes no limitation. This can ensure that editing of an alert event can be completed conveniently.

The embodiments of the present disclosure provide two examples of the alert information. The determining alert information based on the screenshot includes at least one of the following: determining the screenshot as the alert information; or extracting target information from the screenshot and determining the target information as the alert information.

Figure 2:
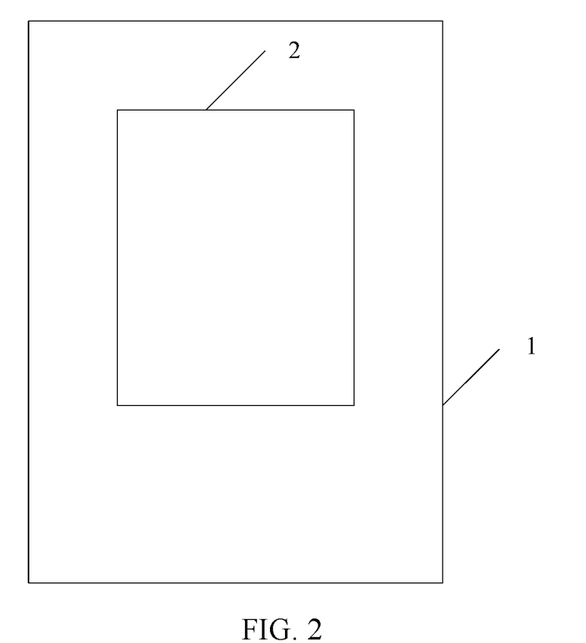
FIG. 2 is a schematic diagram 1 of a display form of alert information according to an embodiment of the present disclosure.

When the screenshot is determined as the alert information, as shown in FIG. 2, when the alert time arrives, a screenshot 2 may be displayed as the alert information for alert on a current interface 1.

Figure 3:
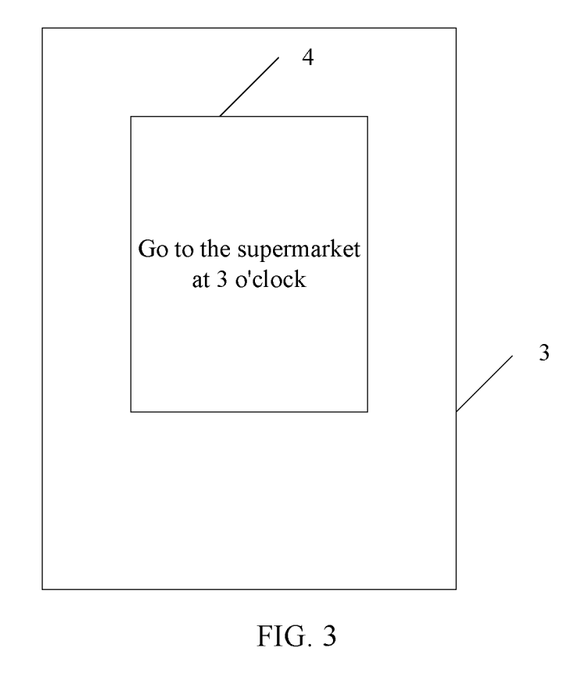
FIG. 3 is a schematic diagram 2 of a display form of alert information according to an embodiment of the present disclosure.

In a case in which the target information is extracted from the screenshot and the target information is determined as the alert information, as shown in FIG. 3, when the alert time arrives, extracted target information 4 pops up on a terminal 3 as the alert information for alert. Extracting the target information may specifically be: obtaining text information as the target information from the screenshot by using an image recognition technology, or obtaining text information from a selected area of the screenshot as the target information.

Optionally, in a case in which the target information in the screenshot is the alert information, when the target alert task is executed, a link is further displayed, where the link is used to trigger display of the screenshot.

That is, in the embodiments of the present disclosure, the operator can choose a variety of methods for alert. For example, in one method, a screenshot is displayed on the interface, and in another method, the target information extracted from the screenshot is displayed, and in this method, a link may be further displayed, so that the operator clicks the link to view the corresponding screenshot, to alert the operator.

Cooperation with a note application or a calendar application may be further performed to display currently recorded alert information in the note application or calendar application. For example, a note is added to the note application, where this note includes the alert time, the alert information (the target information mentioned above), and a screenshot (if there is graffiti, the screenshot is a screenshot including the graffiti). Alternatively, in the calendar application, a new schedule is added in the date corresponding to the alert time, and a specific time and the alert information (the target information mentioned above) are displayed in the schedule. A path of the screenshot may be further displayed, so that the operator clicks the path for redirection, thereby better facilitating actual application of the operator.

Further, after the generating the target alert task based on the alert information and the alert time, the method further includes: storing the alert information to a storage path associated with the first biometric feature information.

Alert permission of the alert task corresponding to the alert information is only provided to the operator of the first biometric feature information. Specifically, when the screen capturing operation is triggered, a front-facing camera may be used to capture a photo, a face may be automatically recognized, and screenshots are grouped according to faces. For example, when an operator A (assuming that operator A is the owner) takes a screenshot, the screenshot is stored in an album, and all subsequent event alert settings are associated with the operator A. If an operator B (not the owner) takes a screenshot, the screenshot is stored in another folder, and all subsequent event alert settings are associated with the operator B. The owner may set whether to allow an event alert notification to be provided to another operator. Viewing permission of files stored to the two paths is only provided to operators matching biometric feature information corresponding to the paths.

Further, after the generating the target alert task based on the alert information and the alert time, the method further includes: establishing an association between the first biometric feature information and the target alert task.

That is, the first biometric feature information and the corresponding target alert task are stored in correspondence with each other, so that the first biometric feature information may be invoked when the target alert task is subsequently performed.

Specifically, the target alert task is performed according to the associated first biometric feature information, to ensure that viewing permission of the alert task is only provided to the corresponding operator.

In the embodiments of the present disclosure, three examples of determining the alert time are provided, and the determining the alert time includes at least one of the following:

when receiving a second input of the first operator, determining a first time for inputting the second input as the alert time;

recognizing a second time in the screenshot, and determining the recognized second time as the alert time; or determining a third time based on preset first delay alert duration, and determining the third time as the alert time.

In the embodiments of the present disclosure, the alert time is determined by using the above three methods. The first method is, for example, obtaining that a second input of the first operator is time information of 8:30 a.m. tomorrow, and using 8:30 a.m. tomorrow as the alert time. The second method is, for example, recognizing that a second time in the screenshot is 2:00 p.m. today, and using 2:00 p.m. today as the alert time. The third method is, for example, if a current time is 8:00 a.m. and the first delay alert duration is ten minutes, determining that a third time is 8:10 a.m., and using 8:10 a.m. as the alert time.

When the operation of determining the alert time includes the above multiple operations, a final alert time is determined according to a priority of each of the above operations. However, this constitutes no limitation. For example, a priority of the first operation is higher than a priority of the second operation, and when the first operation is combined with the second operation, the alert time of the first operation is used as the final alert time. For example, the second operation is combined with the first operation, and the priority of the first operation is higher than the priority of the second operation: Assuming that it is first recognized that the second time in the screenshot is 2:00 p.m. today, 2:00 p.m. today is used as the alert time. Subsequently, it is detected that the second input performed by the first operator on the alert time is time information of 8:30 a.m. tomorrow, and 8:30 a.m. tomorrow is used as the final alert time to replace the alert time of 2:00 p.m. today.

The third operation may be implemented as: determining a third time based on a current time and preset first delay alert duration, and determining the third time as the alert time.

The first operation enables the solution to meet different requirements of different operators. The second operation enables the solution to be more intelligent and automated without manual operation by the operator. The third operation enables the solution to meet the requirement of the operator for privacy of the alert time, and when an operator of the terminal is not the operator corresponding to the alert event, an alert is delayed.

Further, after the performing a screen capturing operation and outputting a screenshot, the method further includes: obtaining a face image of the first operator; and storing the face image and the alert information in association with each other; and the performing a target alert task includes: displaying the alert information, and displaying the face image of the first operator.

That is, the face image of the first operator and the corresponding target information are stored in correspondence with each other, so that the face image of the first operator and the corresponding alert information may be invoked when the target alert task is subsequently performed.

In this way, the alert information is displayed together with the face image of the corresponding operator. Specifically, for example, the captured face is superimposed on the screenshot for display. Then, when the alert information pops up, an identity of the operator who sets the event alert may be known.

Specifically, the biological feature information is face information. After the performing a screen capturing operation, outputting a screenshot, and obtaining biometric feature information of the operator in response to the first input, and before the performing a target alert task based on the screenshot and the biometric feature information, the method further includes: determining facial expression information according to the face information; determining an event alert level according to the facial expression information; determining an alert parameter according to the event alert level; determining alert information based on the screenshot; and generating the target alert task according to the alert parameter and the alert information; where the alert parameter includes an alert time, an alert object, and an alert method.

That is, different levels of alerts may be set, such as, an important level and a general level. The important level corresponds to an alert of 1 minute delay, and the general level corresponds to an alert of 10 minute delay. A quantity of levels and a delay of each level may be specifically set by the user arbitrarily. An alert parameter may include an alert time (an alert delay), an alert object, a contact method of an alert object, an alert method, and the like. The alert method may include an SMS message alert, an alarm clock alert, a message alert, a phone alert, a schedule alert, and the like. In the embodiments of the present disclosure, the operator may be captured during a screen capturing process, and then an expression of the operator is parsed. Specified expressions may be bound to specific settings, for example, the anxious expression corresponds to the important level, and the alert delay duration is determined as 1 minute. Then, according to the above method of determining the alert information, the alert information is determined according to the screenshot, the target alert task is then generated according to the alert parameter and the alert information, and the operator B (contact information of the operator B may be preset) is alerted for binding, so that there is no need to enter an editing interface, thereby accelerating event alert editing.

In addition, the solutions provided in the embodiments of the present disclosure may be further applied to a taxi alert scenario. For example, a passenger (a first operator) may perform a first input on a taxi interface (including a taxi route, license plate information, and the like) to trigger the screen capturing operation. The expression of fear triggers the terminal to determine an event alert level as the highest level, and then the terminal determines an alert parameter according to the event alert level, determines the alert information based on the screenshot; and according to the alert parameter and the alert information, generates and quickly performs the target alert task, to quickly send the passenger's travel information and the passenger's face photo to a pre-designated emergency contact or the police to notify that the passenger is in danger. If the driver temporarily changes the driving route, the passenger may also continuously report the location to the emergency contact by capturing screens for multiple times, to accelerate rescue without the driver's awareness.

The alert method may refer to a communication method for alert, for example, a mobile phone call or a WeChat message. The alert method may also refer to a time at which the relevant information of the alert time is sent to the preset terminal, for example, the relevant information of the alert time is sent to another terminal after being created, or when the alert time arrives, the alert information of the alert event is sent to the preset terminal. The alert method may also refer to a manner in which the relevant information of the alert event is presented, for example, the current terminal displays the screenshot, or the current terminal displays the alert text information corresponding to the alert event.

Specifically, the performing the target alert task based on the screenshot and the first biometric feature information includes: in a case that the alert time of the target alert task arrives, obtaining second biometric feature information of the second operator (specifically may be an operator currently using the terminal); in a case that the second biometric feature information matches the first biometric feature information, performing the target alert task; and in a case that the second biometric feature information does not match the first biometric feature information, delaying the preset second delay alert duration, and performing the target alert task.

That is, in a specific implementation, when the alert time of the event arrives, the front-facing camera may be used to observe whether the current operator is the owner (if no one is currently using the terminal, it may be considered that the owner is in use); if the owner is in use, the owner is alerted; and otherwise, the alert is automatically delayed for a period of time, which can more effectively protect privacy of the operator.

For example, the first biometric feature information is biometric feature information of the operator A. In a case that the alert time of the target alert task arrives, when the second operator is the operator A, the target alert task is performed. When the second operator is the operator B, the preset second delay alert duration is delayed, and the target alert task is performed.

In the embodiments of the present disclosure, when the operator B (not the owner) takes a screenshot and sets an event alert, the operator B may choose at least one of the following methods for alert.

The first method is sharing a setting operation with a preset terminal through a sharing option after setting is completed, where a data format may be agreed on in advance. In this way, the data format may be automatically parsed after sharing with the preset terminal, and then a corresponding event alert is automatically generated in the preset terminal. Specifically, the preset terminal may refer to a second terminal device of the operator A or a terminal of the operator B. In addition, the terminal of the operator B is associated with the first biometric feature information, for example, the terminal of the operator B is authorized for the task alert based on the first biometric feature information. That is, in this method, in addition to being applicable to operator A (the owner), the operator A (the owner) may share the setting operation.

Correspondingly, after the performing a screen capturing operation, outputting a screenshot, and obtaining first biometric feature information of the first operator in response to the first input, the method further includes: sending alert task information of the target alert task to a target terminal associated with the first biometric feature information; where the alert task information includes alert information and an alert time.

The performing a target alert task includes: triggering the target terminal to perform the target alert task.

That is, the setting operation of the alert event is shared with the preset terminal, and the corresponding alert task is performed by the preset terminal, so that when it is inconvenient for the operator B (not the owner) to directly edit an alert event on the terminal, it is convenient to complete editing of the alert event.

The second method is storing relevant settings in the terminal of the operator A (the owner), and then setting specified contact information. After the specified time arrives, the terminal of the operator A may call the terminal of the operator B, send an SMS message to the terminal of the operator B, or the like to alert the operator B.

In this way, there is another situation in which the operator A (the owner) takes a screenshot to alert another person to do something. Contact information of the alerted person may be noted in the editing interface, to notify the specified person when a preset time arrives.

Correspondingly, after the performing a screen capturing operation, outputting a screenshot, and obtaining first biometric feature information of the first operator in response to the first input, the method further includes: obtaining a target contact manner input by the first operator.

The performing a target alert task includes: when the alert time of the target alert task arrives, sending, in the target contact manner, the alert information to a target object associated with the target contact manner.

That is, the terminal that sets the alert event performs the relevant alert task, and sends the alert information to the target object in the target contact manner, to conveniently alert the operator B (not the owner).

For example: after the performing the screen capturing operation, outputting the screenshot, and obtaining the first biometric feature information of the operator B (not the owner) in response to the first input of the operator B (not the owner), the target contact manner (such as mobile phone numbers or an SMS message) inputted by the operator B (not the owner) is obtained; when the alert time of the target alert task arrives, the alert information is sent, in the target contact manner, to the target object (such as a terminal inserted with a SIM corresponding to the mobile phone numbers) associated with the target contact manner.

Figure 4:
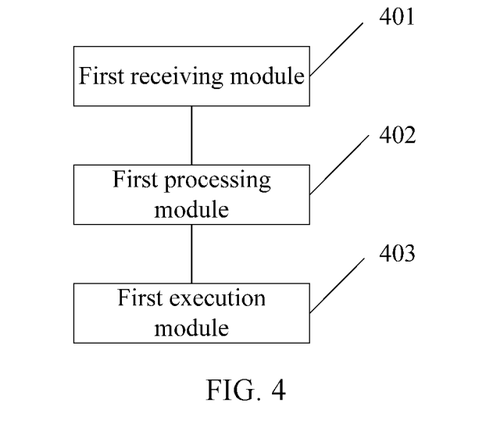
FIG. 4 is a schematic structural diagram 1 of a terminal according to an embodiment of the present disclosure.

An embodiment of the present disclosure further provides a terminal. As shown in FIG. 4, the terminal includes:
 a first receiving module 401, configured to receive a first input of a first operator;
 a first processing module 402, configured to perform a screen capturing operation, output a screenshot, and obtain first biometric feature information of the first operator in response to the first input; and
 a first execution module 403, configured to perform a target alert task based on the screenshot and the first biometric feature information.

The terminal provided in the embodiments of the present disclosure receives a first input of a first operator; performs a screen capturing operation, outputs a screenshot, and obtains first biometric feature information of the first operator in response to the first input; and performs a target alert task based on the screenshot and the first biometric feature information. This can avoid privacy leakage caused by event alert when a mobile phone is not used by an owner, and privacy of the owner can be well protected. Because the target alert task is performed based on the first biometric feature information, security of task alert is improved.

The biometric feature information includes at least one of the following: face information, fingerprint information, or iris information.

Further, the terminal further includes: a first determining module, configured to: after the performing a screen capturing operation, outputting a screenshot, and obtaining biometric feature information of the operator in response to the first input; and before the performing a target alert task based on the screenshot and the biometric feature information, determine an alert time; a second determining module, configured to determine alert information based on the screenshot; and a first generation module, configured to generate the target alert task based on the alert information and the alert time.

The determining alert information based on the screenshot includes at least one of the following:
 determining the screenshot as the alert information; or extracting target information from the screenshot and determining the target information as the alert information.

Further, the terminal further includes: a first storage module, configured to: after the generating the target alert task based on the alert information and the alert time, store the alert information to a storage path associated with the first biometric feature information.

Further, the terminal further includes: a first establishment module, configured to: after the generating the target alert task based on the alert information and the alert time, establish an association between the first biometric feature information and the target alert task.

In the embodiments of the present disclosure, the determining an alert time includes at least one of the following:
when receiving a second input of the first operator, determining a first time for inputting the second input as the alert time;
recognizing a second time in the screenshot, and determining the recognized second time as the alert time; or
determining a third time based on preset first delay alert duration, and determining the third time as the alert time.

In the embodiments of the present disclosure, the terminal further includes: a first obtaining module, configured to: after the performing a screen capturing operation and outputting a screenshot, obtain a face image of the first operator; and a second storage module, configured to store the face image and the alert information in association with each other; and the first execution module includes: a first processing submodule, configured to display the alert information, and display the face image of the first operator.

Specifically, the biological feature information is face information. The terminal further includes: a third determining module, configured to: after the performing a screen capturing operation, outputting a screenshot, and obtaining biometric feature information of the operator in response to the first input, and before the performing a target alert task based on the screenshot and the biometric feature information, determine facial expression information according to the face information; a fourth determining module, configured to determine an event alert level according to the facial expression information; a fifth determining module, configured to determine an alert parameter according to the event alert level; a sixth determining module, configured to determine alert information based on the screenshot; and a second generation module, configured to generate the target alert task according to the alert parameter and the alert information; where the alert parameter includes an alert time, an alert object, and an alert method.

Specifically, the first execution module includes: a first obtaining submodule, configured to obtain second biometric feature information of a second operator when the alert time of the target alert task arrives; a first execution submodule, configured to perform the target alert task when the second biometric feature information matches the first biometric feature information; and a second execution submodule, configured to delay a preset second delay alert duration and perform the target alert task when the second biometric feature information does not match the first biometric feature information.

In the embodiments of the present disclosure, when the operator B (not the owner) takes a screenshot and sets an event alert, the operator B may choose at least one of the following methods for alert.

In the first method, the terminal further includes: a first sending module, configured to: after the performing a screen capturing operation, outputting a screenshot, and obtaining first biometric feature information of the first operator in response to the first input, send alert task information of the target alert task to a target terminal associated with the first biometric feature information; where the alert task information includes alert information and an alert time.

The first execution module includes: a first triggering submodule, configured to trigger the target terminal to perform the target alert task.

In the second method, the terminal further includes: a second obtaining module, configured to: after the performing a screen capturing operation, outputting a screenshot, and obtaining first biometric feature information of the first operator in response to the first input, obtain a target contact manner input by the first operator.

The first execution module includes: a second processing submodule, configured to: when the alert time of the target alert task arrives, send, in the target contact manner, the alert information to a target object associated with the target contact manner.

A terminal according to an embodiment of the present disclosure can implement the processes performed by the terminal in the method embodiments in FIG. 1 to FIG. 3. To avoid repetition, details are not described herein again.

Figure 5:
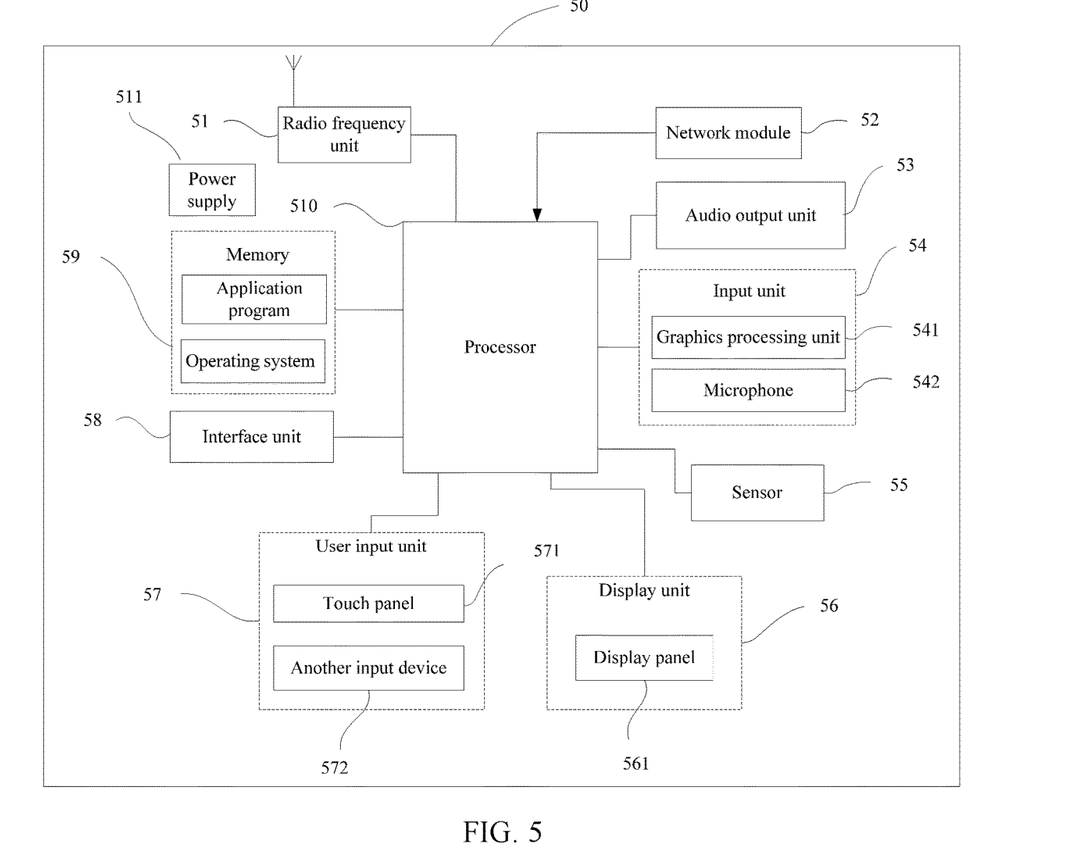
FIG. 5 is a schematic structural diagram 2 of a terminal according to an embodiment of the present disclosure.

FIG. 5 is a schematic structural diagram of hardware of a terminal implementing embodiments of the present disclosure. The terminal 50 includes but is not limited to: a radio frequency unit 51, a network module 52, an audio output unit 53, an input unit 54, a sensor 55, a display unit 56, a user input unit 57, an interface unit 58, a memory 59, a processor 510, a power supply 511, and other components. A person skilled in the art may understand that the structure of the terminal shown in FIG. 5 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The processor 510 is configured to: receive a first input of a first operator; perform a screen capturing operation, output a screenshot, and obtain first biometric feature information of the first operator in response to the first input; and perform a target alert task based on the screenshot and the first biometric feature information.

In the embodiments of the present disclosure, a first input of a first operator is received; a screen capturing operation is performed, a screenshot is output, and first biometric feature information of the first operator is obtained in response to the first input; and a target alert task is performed based on the screenshot and the first biometric feature information. This can avoid privacy leakage caused by event alert when a mobile phone is not used by an owner, and privacy of the owner can be well protected. Because the target alert task is performed based on the first biometric feature information, security of task alert is improved.

Optionally, the biometric feature information includes at least one of the following: face information, fingerprint information, or iris information.

Optionally, the processor 510 is further configured to: after the performing a screen capturing operation, outputting a screenshot, and obtaining biometric feature information of the operator in response to the first input; and before the performing a target alert task based on the screenshot and the biometric feature information, determine an alert time;

determine alert information based on the screenshot; and generate the target alert task based on the alert information and the alert time.

Optionally, the determining alert information based on the screenshot includes at least one of the following:

determining the screenshot as the alert information; or extracting target information from the screenshot and determining the target information as the alert information.

Optionally, the processor 510 is further configured to: after the generating the target alert task based on the alert information and the alert time, store the alert information to a storage path associated with the first biometric feature information.

Optionally, the processor 510 is further configured to: after the generating the target alert task based on the alert information and the alert time, establish an association between the first biometric feature information and the target alert task.

Optionally, the determining an alert time includes at least one of the following:

when receiving a second input of the first operator, determining a first time for inputting the second input as the alert time;

recognizing a second time in the screenshot, and determining the recognized second time as the alert time; or determining a third time based on preset first delay alert duration, and determining the third time as the alert time.

Optionally, the processor 510 is further configured to: after the performing a screen capturing operation and outputting a screenshot, obtain a face image of the first operator; and store the face image and the alert information in association with each other.

The processor 510 is specifically configured to: display the alert information, and display the face image of the first operator.

Optionally, the biological feature information is face information. The processor 510 is further configured to: after the performing a screen capturing operation, outputting a screenshot, and obtaining biometric feature information of the operator in response to the first input, and before the performing a target alert task based on the screenshot and the biometric feature information, determine facial expression information according to the face information; determine an event alert level according to the facial expression information; determine an alert parameter according to the event alert level; determine alert information based on the screenshot; and generate the target alert task according to the alert parameter and the alert information; where the alert parameter includes an alert time, an alert object, and an alert method.

Optionally, the processor 510 is specifically configured to: obtain second biometric feature information of a second operator when the alert time of the target alert task arrives; perform the target alert task when the second biometric feature information matches the first biometric feature information; and delay a preset second delay alert duration and perform the target alert task when the second biometric feature information does not match the first biometric feature information.

Optionally, the processor 510 is further configured to: after the performing a screen capturing operation, outputting a screenshot, and obtaining first biometric feature information of the first operator in response to the first input, send alert task information of the target alert task to a target terminal associated with the first biometric feature information; where the alert task information includes alert information and an alert time.

The processor 510 is further configured to: trigger the target terminal to perform the target alert task.

Optionally, the processor 510 is further configured to: after the performing a screen capturing operation, outputting a screenshot, and obtaining first biometric feature information of the first operator in response to the first input, obtain a target contact manner input by the first operator.

The processor 510 is specifically configured to: when the alert time of the target alert task arrives, send, in the target contact manner, the alert information to a target object associated with the target contact manner.

It should be understood that in the embodiments of the present disclosure, a radio frequency unit 51 can be configured to receive and send information or receive and send signal during calls. Specifically, the radio frequency unit receives downlink data from a base station, and transmits the downlink data to the processor 510 for processing. In addition, the radio frequency unit sends uplink data to the base station. Generally, the radio frequency unit 51 includes, but is not limited to, an antenna, at least one amplifier, a transceiver, a coupler, a low noise amplifier, a duplexer, and the like. In addition, the radio frequency unit 51 may further communicate with other devices through a wireless communications system and network.

The terminal provides wireless broadband Internet access to a user through the network module 52, for example, helps the user receive and send e-mails, browse web pages, and access streaming media, etc.

The audio output unit 53 may convert audio data received by the radio frequency unit 51 or the network module 52 or stored in the memory 59 into an audio signal, and output the audio signal into sound. Moreover, the audio output unit 53 may further provide audio output (for example, call signal receiving sound and message receiving sound) related to a specific function performed by the terminal 50. The audio output unit 53 includes a speaker, a buzzer, a telephone receiver, and the like.

The input unit 54 is configured to receive audio or video signals. The input unit 54 may include a graphics processing unit (GPU) 541 and a microphone 542. The graphics processing unit 541 processes image data of a static image or a video obtained by an image capturing apparatus (for example, a camera) in a video capturing mode or an image capturing mode. A processed image frame can be displayed on the display unit 56. The image frame processed by the graphics processing unit 541 may be stored in the memory 59 (or another storage medium) or sent through the radio frequency unit 51 or the network module 52. The microphone 542 may receive a sound and can process such sound into audio data. Processed audio data may be converted, in telephone call mode, into a format that can be sent to a mobile communication base station via the radio frequency unit 51 for output.

The terminal 50 further includes at least one sensor 55, for example, an optical sensor, a motion sensor, and other sensors. Specifically, the optical sensor includes an ambient optical sensor and a proximity sensor. The ambient optical sensor can adjust a brightness of a display panel 561 based on a brightness of ambient light. The proximity sensor can close the display panel 561 and/or backlight when the terminal 50 moves to an ear. As a type of motion sensor, an accelerometer sensor can detect magnitudes of accelerations in all directions (usually three axes), can detect a magnitude and a direction of gravity in a static state, and can be applied to terminal posture recognition (such as screen switching between portrait and landscape, related games, and magnetometer posture calibration), functions related to vibration recognition (such as pedometer and tapping), and the like. The sensor 55 may also include a fingerprint sensor, a pressure sensor, an iris sensor, a molecular sensor, a gyroscope, a barometer, a hygrometer, a thermometer, an infrared sensor, and the like. Details are not described herein.

The display unit 56 is configured to display information entered by a user or information provided for the user. The display unit 56 may include a display panel 561, and the display panel 561 may be configured in a form of liquid crystal display (LCD), organic light-emitting diode (OLED), or the like.

The user input unit 57 can be configured to receive the inputted digital or character information, and generate key signal input related to user setting and function control of the terminal. Specifically, the user input unit 57 includes a touch panel 571 and another input device 572. The touch panel 571 is also referred to as a touchscreen, and may collect a touch operation performed by a user on or near the touch panel 571 (such as an operation performed by a user on the touch panel 571 or near the touch panel 571 by using any proper object or accessory, such as a finger or a stylus). The touch panel 571 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 571 may be of a resistive type, a capacitive type, an infrared type, a surface acoustic wave type, or the like. In addition to the touch panel 571, the user input unit 57 may also include another input device 572. Specifically, the another input device 572 may include but is not limited to a physical keyboard, a function key (such as a volume control key or a power on/off key), a trackball, a mouse, a joystick, and the like. Details are not described herein.

Further, the touch panel 571 may cover the display panel 561. When detecting the touch operation on or near the touch panel 571, the touch panel 571 transmits the touch operation to the processor 510 to determine a type of a touch event, and then the processor 510 provides corresponding visual output on the display panel 561 based on the type of the touch event. Although in FIG. 5, the touch panel 571 and the display panel 561 are configured as two independent components to implement input and output functions of the terminal, in some embodiments, the touch panel 571 and the display panel 561 can be integrated to implement the input and output functions of the terminal. Details are not limited herein.

The interface unit 58 is an interface connecting an external apparatus to the terminal 50. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 58 can be configured to receive an input (for example, data information and power) from the external apparatus and transmit the received input to one or more elements in the terminal 50, or transmit data between the terminal 50 and the external apparatus.

The memory 59 may be configured to store a software program as well as every kind of data. The memory 59 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 59 may include a high-speed random access memory, and may further include a non-volatile memory such as at least one magnetic disk storage component, a flash memory component, or another volatile solid-state storage component.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that, alternatively, the modem processor may not be integrated into the processor 510.

The terminal 50 may further include the power supply 511 (such as a battery) that supplies power to each component. Optionally, the power supply 511 may be logically connected to the processor 510 by using a power management system, so as to implement functions such as charging, discharging, and power consumption management by using the power management system.

In addition, the terminal 50 includes some functional modules not shown. Details are not described herein.

Optionally, an embodiment of this application further provides a terminal, including a processor 510, a memory 59, and a computer program stored in the memory 59 and executable on the processor 510. When the computer program is executed by the processor 510, processes of embodiments of the foregoing alert task processing method are implemented, and same technical effects can be achieved. To avoid repetition, details are not described herein again.

An embodiment of the present disclosure further provides a computer-readable storage medium. The computer-readable storage medium stores a computer program. When the computer program is executed by a processor, processes of embodiments of the foregoing alert task processing method are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to related art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. An alert task processing method, comprising:
receiving a first input of a first operator;
performing a screen capturing operation, outputting a screenshot, and obtaining first biometric feature information of the first operator in response to the first input; and
performing a target alert task based on the screenshot and the first biometric feature information;
wherein the performing a target alert task based on the screenshot and the first biometric feature information comprises:
obtaining second biometric feature information of a second operator when the alert time of the target alert task arrives;
performing the target alert task when the second biometric feature information matches the first biometric feature information; and
delaying a preset second delay alert duration and performing the target alert task when the second biometric feature information does not match the first biometric feature information.

2. The alert task processing method according to claim 1, wherein the biometric feature information comprises at least one of the following: face information, fingerprint information, or iris information.

3. The alert task processing method according to claim 1, wherein after the performing a screen capturing operation, outputting a screenshot, and obtaining biometric feature information of the operator in response to the first input, and before the performing a target alert task based on the screenshot and the biometric feature information, the method further comprises:
determining an alert time;
determining alert information based on the screenshot; and
generating the target alert task based on the alert information and the alert time.

4. The alert task processing method according to claim 3, wherein the determining alert information based on the screenshot comprises at least one of the following:

determining the screenshot as the alert information; or
extracting target information from the screenshot and determining the target information as the alert information.

5. The alert task processing method according to claim 3, wherein after the generating the target alert task based on the alert information and the alert time, the method further comprises:
storing the alert information to a storage path associated with the first biometric feature information.

6. The alert task processing method according to claim 3, wherein after the generating the target alert task based on the alert information and the alert time, the method further comprises:
establishing an association between the first biometric feature information and the target alert task.

7. The alert task processing method according to claim 3, wherein the determining an alert time comprises at least one of the following:
when receiving a second input of the first operator, determining a first time for inputting the second input as the alert time;
recognizing a second time in the screenshot, and determining the recognized second time as the alert time; or
determining a third time based on preset first delay alert duration, and determining the third time as the alert time.

8. The alert task processing method according to claim 3, wherein after the performing a screen capturing operation and outputting a screenshot, the method further comprises:
obtaining a face image of the first operator; and
storing the face image and the alert information in association with each other; and
the performing a target alert task comprises:
displaying the alert information, and displaying the face image of the first operator.

9. The alert task processing method according to claim 3, wherein after the performing a screen capturing operation, outputting a screenshot, and obtaining first biometric feature information of the first operator in response to the first input, the method further comprises:
obtaining a target contact manner input by the first operator; and
the performing a target alert task comprises:
when the alert time of the target alert task arrives, sending, in the target contact manner, the alert information to a target object associated with the target contact manner.

10. The alert task processing method according to claim 1, wherein after the performing a screen capturing operation, outputting a screenshot, and obtaining first biometric feature information of the first operator in response to the first input, the method further comprises:
sending alert task information of the target alert task to a target terminal associated with the first biometric feature information;
wherein the alert task information comprises alert information and an alert time; and
the performing a target alert task comprises:
triggering the target terminal to perform the target alert task.

11. An alert task processing method, comprising:
receiving a first input of a first operator;
performing a screen capturing operation, outputting a screenshot, and obtaining first biometric feature information of the first operator in response to the first input; and performing a target alert task based on the screenshot and the first biometric feature information;

wherein the biometric feature information is face information;

after the performing a screen capturing operation, outputting a screenshot, and obtaining biometric feature information of the operator in response to the first input; and before the performing a target alert task based on the screenshot and the biometric feature information, the method further comprises:

determining facial expression information according to the face information;

determining an event alert level according to the facial expression information;

determining an alert parameter according to the event alert level;

determining alert information based on the screenshot; and generating the target alert task according to the alert parameter and the alert information;

wherein the alert parameter comprises an alert time, an alert object, and an alert method.

12. A terminal, comprising a processor, a memory, and a computer program stored in the memory and executable on the processor, wherein the computer program is executed by the processor to implement:

receiving a first input of a first operator;

performing a screen capturing operation, outputting a screenshot, and obtaining first biometric feature information of the first operator in response to the first input; and performing a target alert task based on the screenshot and the first biometric feature information;

wherein the performing a target alert task based on the screenshot and the first biometric feature information comprises:

obtaining second biometric feature information of a second operator when the alert time of the target alert task arrives;

performing the target alert task when the second biometric feature information matches the first biometric feature information; and delaying a preset second delay alert duration and performing the target alert task when the second biometric feature information does not match the first biometric feature information.

13. The terminal according to claim 12, wherein the biometric feature information comprises at least one of the following: face information, fingerprint information, or iris information.

14. The terminal according to claim 12, wherein the computer program is further executed by the processor to implement:

determining an alert time;

determining alert information based on the screenshot; and generating the target alert task based on the alert information and the alert time.

15. The terminal according to claim 14, wherein the determining alert information based on the screenshot comprises at least one of the following:

determining the screenshot as the alert information; or extracting target information from the screenshot and determining the target information as the alert information.

16. The terminal according to claim 14, wherein the computer program is further executed by the processor to implement:

storing the alert information to a storage path associated with the first biometric feature information.

17. The terminal according to claim 14, wherein the computer program is further executed by the processor to implement:

establishing an association between the first biometric feature information and the target alert task.

18. The terminal according to claim 14, wherein the determining an alert time comprises at least one of the following:

when receiving a second input of the first operator, determining a first time for inputting the second input as the alert time;

recognizing a second time in the screenshot, and determining the recognized second time as the alert time; or determining a third time based on preset first delay alert duration, and determining the third time as the alert time.

19. The terminal according to claim 14, wherein the computer program is further executed by the processor to implement:

obtaining a face image of the first operator; and storing the face image and the alert information in association with each other; and the performing a target alert task comprises:

displaying the alert information, and displaying the face image of the first operator.

20. A non-transitory computer-readable storage medium, wherein the non-transitory computer-readable storage medium stores a computer program, and the computer program is executed by a processor to implement steps of the alert task processing method according to claim 1.

* * * * *